March 3, 1942.    J. V. SHARP    2,274,746

RECTIFICATION SYSTEM

Original Filed May 20, 1938

INVENTOR.
John V Sharp
BY
ATTORNEY

Patented Mar. 3, 1942

2,274,746

UNITED STATES PATENT OFFICE 2,274,746

RECTIFICATION SYSTEM

John V. Sharp, Cleveland Heights, Ohio, assignor to Slayter Electronic Corporation, Newark, Ohio, a corporation of Ohio Application May 20, 1938, Serial No. 209,118
Renewed June 19, 1940

10 Claims. (Cl. 175—363)

My invention relates broadly to rectifiers and more particularly to a simplified and inexpensive construction of rectifier for high potentials.

One of the objects of my invention is to provide a simplified arrangement of high potential rectifier employing an electric discharge system substantially at atmospheric pressures.

Another object of my invention is to provide a construction of high potential rectifier including discharge electrodes and a target and employing an electric discharge at substantially atmospheric pressures and in which the generation of wind is substantially eliminated and energy losses reduced and dirt and foreign matter prevented from precipitating on the target of the rectifier.

Still another object of my invention is to provide a construction of high potential rectifier employing a target electrode and a bank of discharge electrodes directed toward each other on opposite sides of the target electrode for substantially neutralizing pressure effects while effecting rectification of energy impressed successively and alternately between the target electrode and the respective banks of discharge electrodes.

Figure 1:
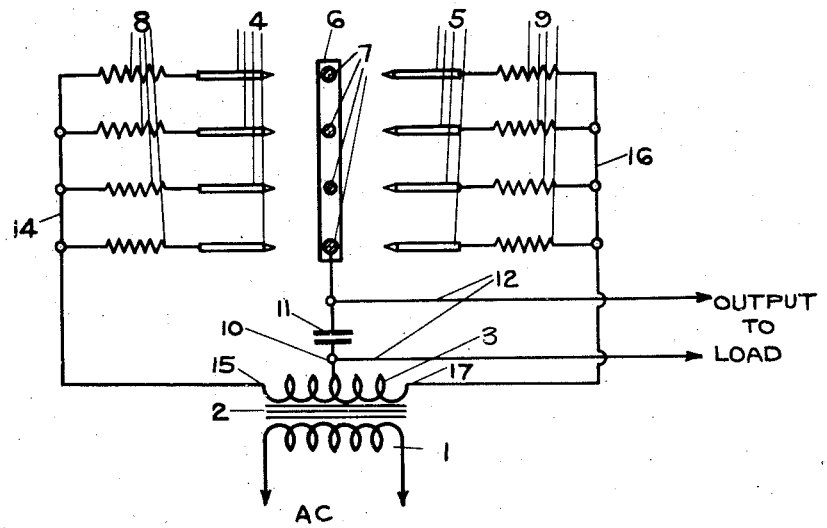
Figure 2:
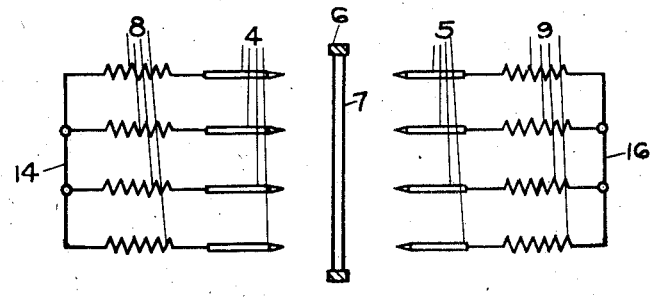

Other and further objects of my invention reside in an inexpensive and simplified arrangement of rectifier system as set forth more fully in the specification hereinafter following by reference to the accompanying drawing in which:

Figure 1 is a schematic view illustrating the rectifier system of my invention with the electrodes shown in vertical section and showing the electrical circuit employed in connection therewith; and Fig. 2 is a plan view of the electrode structure illustrated in Fig. 1.

My invention is directed to an arrangement of simple point to grid rectifier employing electric discharge at substantially atmospheric pressures. I arrange a bank at points in symmetrical positions on opposite sides of the plane of a grid-like electrode. The banks of points are directed toward each other symmetrically on each side of the grid-like electrode so that the planes of the tips of the points are parallel and equi-distant from the grid-like electrode. The grid-like electrode serves as a target receiving the electric discharge from the two banks of points. An input transformer having its primary winding connected to the source of alternating current to be rectified, has the opposite terminals of its secondary winding connected to the respective banks of points. A mid-tap connection extends from the secondary winding through a condenser to the grid-like electrode. By applying the alternating current from the source to be rectified to the primary winding, alternating current is supplied during each half cycle between the respective banks of the discharge points and the target. A. D. C. potential is built up on the condenser. The magnitude of this D. C. potential varies with the spacial relation of the discharge points with respect to the grid-like electrode and with respect to the applied secondary voltage. The fact that the symmetrical banks of discharge points are directed toward each other from symmetrical positions on opposite sides of the grid-like electrode compensates for pressure effects so that no wind is produced, thereby reducing energy losses and preventing precipitation of dirt on the grid-like electrode. Moreover, positive streamers are reduced and may be eliminated by proper shielding. The applied potential is maintained at a safe value below that potential which produces spark discharge, and brush and corona effects are maintained at a minimum.

Referring to the drawing in detail, reference character I designates the primary winding of the input high step-up ratio transformer 2 having secondary winding 3. The alternating current to be rectified is applied to the primary winding I and the high voltage due to the high step-up transformation ratio of transformer 2 delivered by secondary winding 3 to the rectifier system.

The rectifier system comprises two banks of discharge points designated at 4 and 5, respectively. These discharge points are directed toward each other and arranged symmetrically on opposite sides of the foraminated or grid-like electrode designated generally at 6. The grid-like electrode 6 serves as a target with respect to the banks of discharge points 4 and 5. Transversely extending parallel rods 7 are included in the structure of the grid-like electrode 6 arranged in alignment with the banks of discharge points 4 and 5. The banks of discharge points 4 and 5 each have a resistor individual to each discharge point in series circuit with each discharge point as represented at 8 and 9. These resistors 8 and 9 insure equal distribution of energy in the circuits leading to each discharge point and eliminate danger of breakdown by sparking or excessive brushing or corona effects at any one of the discharge points.

The secondary winding 3 is provided with a center tap 10 to which connection is made from target 6 through condenser 11. Tap connections 12 are taken off from opposite sides of condenser 11 to deliver the rectified current to a load. It will be observed that in Fig. 1, I have shown the grid-like electrode 6 having the parallel rod members 7 shown in cross section with the banks of discharge points 4 and 5 aligned with the several rod members 7. In Fig. 2 I have shown the parallel rod members 7 in elevation with the banks of electrodes 4 and 5 having the discharge points thereof distributed in substantially equal spaced relation along the length of the parallel rods. Thus it will be understood that the banks of discharge points 4 and 5 extend in multiple arrangement both vertically and transversely, and yet by virtue of the arrangement of resistors 8 and 9, provide equal distribution paths for energy from the discharge points to the target. The resistors 8 are connected to the same bus indicated at 14 which connects to one end 15 of secondary winding 3. The resistors 9 are connected through a common bus 16 to the end 17 of secondary winding 3.

The planes of the tips of the banks of discharge points 4 and 5 are parallel and equi-distant from the rods 7. The magnitude of the direct current potential built up on condenser 11 varies with the spacial relation of the tips of the discharge points with respect to the parallel rods in the grid-like electrode. The magnitude of the direct current potential built up on condenser 11 also varies in proportion to the voltage delivered across the secondary winding 3. The successive cycles of the alternating current cause charges to be built up on condenser 11 by which rectified direct current is supplied to the load circuit through condensers 12. It will be understood that on one-half cycle, the bank of discharge points 4 causes an electric discharge with respect to rod 7 in circuit with condenser 11, while on the succeeding one-half cycle, the bank of discharge electrodes 5 causes an electric discharge with respect to rod 7 through condenser 11. A D. C. potential is built up on condenser 11 by the continuous supply of alternating current to the rectifier system and through current delivered to a load through terminals 12.

The advantages of my invention over previous arrangements is that pressure effects are compensated by the alignment of the series of discharge points with respect to each other and wind is not produced. This reduces energy losses and prevents dirt from precipitating on the rod members 7. Positive streamers are also reduced and may be eliminated by proper shielding.

The rectifier system of my invention has proven very effective at atmospheric pressures. While I have described my invention in its preferred embodiment, I desire that it be understood that modifications may be made and that no limitations upon my invention are intended other than may be imposed by the scope of the appended claims.

What I claim as new and desire to secure by Letters Patent of the United States is as follows:

1. In a rectification system, a grid-like target electrode including a plurality of longitudinally extending conductive member, a multiplicity of discharge points spaced transversely with respect to the longitudinally extending conductive members, said discharge points being symmetrically arranged in two-dimensional banks on opposite sides of said target electrode and terminating in planes equi-distant from opposite sides of said target electrode, an alternating current power supply system including a transformer having a primary and a secondary winding, said secondary winding having opposite ends thereof connected with the respective banks of said discharge points, a condenser, a connection from one side of said condenser to the electrical mid-point of said secondary winding, a connection from the opposite side of said condenser to said target electrode, and an output circuit connected at opposite sides of said condenser for supplying rectified current to a load.

2. In a rectification system, a grid-like target electrode including a plurality of longitudinally extending conductive members, a multiplicity of discharge points spaced transversely with respect to the longitudinally extending conductive members, said discharge points being symmetrically arranged in two-dimensional banks on opposite sides of said target electrode and terminating in planes equi-distant from opposite sides of said target electrode, an alternating current power supply system including a transformer having a primary and a secondary winding, said secondary winding having opposite ends thereof connected with the respective banks of said discharge electrodes, a condenser, a connection from one side of said condenser to the electrical mid-point of said secondary winding, a connection from the opposite side of said condenser to said target electrode, an output circuit connected at opposite sides of said condenser for supplying rectified current to a load, and means disposed between the ends of said secondary winding and said banks of discharge electrodes for equalizing the current supplied to each of said discharge points.

3. In a rectification system employing electric discharge and target electrodes, a grid-like target electrode comprising a plurality of longitudinally extending electrode members supported in spaced parallel relation in a common plane, and a multiplicity of discharge electrodes symmetrically arranged in two-dimensional formation on either side of said target electrode and coaxially aligned in pairs and arranged in spaced parallel relation transversely with respect to said longitudinally extending electrode members in said target electrode, said discharge electrodes terminating in common planes parallel to the plane of said target electrode and equally spaced therefrom.

4. In a rectification system employing electric discharge and target electrodes, a grid-like target electrode, and discharge electrodes disposed on opposite sides thereof for discharge with respect thereto, said discharge electrodes being arranged in opposite relation in two-dimensional formations parallel with said target electrode so that physical effects accompanying the respective discharges therefrom with respect to the intermediate target electrode are substantially neutralized.

5. In a rectifier for full wave rectification of high potential values by electric discharge, a target electrode comprising an open framework structure for allowing the passage of air therethrough, and discharge electrodes symmetrically arranged on opposite sides of said open framework structure in two-dimensional formations parallel with said open framework structure, whereby electric wind produced by discharge from said discharge electrodes is mutually counteracted in the region of said target electrode for preserving the constancy of the discharge incident at said target electrode.

6. In a rectifier for full wave rectification of high potential values by electric discharge, a target electrode of open grid-like construction, and discharge electrodes symmetrically arranged on opposite sides of said target electrode in two-dimensional formations parallel with said target electrode, electric wind phenomena accompanying the successive discharges from oppositely disposed discharge electrodes being cumulative in the space between said discharge and target electrodes and effective for mutual counteraction in the region of said open grid-like target electrode, whereby energy losses due to said wind phenomena are reduced.

7. In a rectification system, a grid-like target electrode including a plurality of longitudinally extending conductive members, a multiplicity of discharge points spaced transversely with respect to the longitudinally extending conductive members, said discharge points being symmetrically arranged in two-dimensional banks on opposite sides of said target electrode and terminating in planes equi-distant from opposite sides of said target electrode, an alternating current power supply system including a transformer having a primary and a secondary winding, said secondary winding having opposite ends thereof connected with the respective banks of said discharge points, an impedance, a connection from one side of said impedance to the electrical midpoint of said secondary winding, a connection from the opposite side of said impedance to said target electrode, and an output circuit connected at opposite sides of said impedance for supplying rectified current to a load.

8. In a rectification system, a grid-like target electrode including a plurality of longitudinally extending conductive members, a multiplicity of discharge members spaced transversely with respect to the longitudinally extending conductive members, said discharge members being symmetrically arranged in two-dimensional banks on opposite sides of said target electrode and terminating in planes equi-distant from opposite sides of said target electrode, an alternating current power supply system including a transformer having a primary and a secondary winding, said secondary winding having opposite ends thereof connected with the respective banks of said discharge members, a condenser, a connection from one side of said condenser to the electrical midpoint of said secondary winding, a connection from the opposite side of said condenser to said target electrode, and an output circuit connected at opposite sides of said condenser for supplying rectified current to a load.

9. In a rectification system employing electric discharge and target electrodes, a foraminated grid-like target electrode comprising a foraminated area constituting a plane surface and a multiplicity of discharge members symmetrically arranged in two-dimensional formation on either side of said target electrode and coaxially aligned in pairs and arranged in spaced parallel relation transversely with respect to said foraminated target electrode, said discharge members terminating in common planes parallel to the plane of said target electrode and equally spaced therefrom.

10. An electric discharge system comprising in combination a foraminated grid-like target electrode and coacting discharge electrodes spaced on opposite sides of said foraminated grid-like target electrode, said discharge electrodes each comprising a plurality of emitting points disposed in two-dimensional array, said plurality of emitting points being uniformly spaced one from another and each directed toward opposite sides of said foraminated grid-like target electrode.

JOHN V. SHARP.